United States Patent

[11] 3,626,456

| [72] | Inventor | George William Freeborn<br>21421 Moneta Ave., Carson, Calif. 90745 |
|---|---|---|
| [21] | Appl. No. | 847,267 |
| [22] | Filed | Aug. 4, 1969 |
| [45] | Patented | Dec. 7, 1971 |

[54] RADIUS TURNING ATTACHMENT FOR LATHES
6 Claims, 5 Drawing Figs.

| [52] | U.S. Cl. | 82/12 |
|---|---|---|
| [51] | Int. Cl. | B23b 5/40 |
| [50] | Field of Search | 82/12, 11 |

[56] References Cited
UNITED STATES PATENTS

| 1,435,453 | 11/1922 | Davis et al. | 82/12 |
| 2,168,633 | 8/1939 | Smith | 82/12 |
| FOREIGN PATENTS | | | |
| 18,150 | 9/1900 | Great Britain | 82/12 |

*Primary Examiner*—Leonidas Vlachos
*Attorney*—John Holtrichter, Jr.

ABSTRACT: The disclosed device is a radius turning attachment intended for use with conventional lathes. A tool post is mounted atop a disc-shaped tool base having a peripherally situated ring gear adapted to be engaged by a movable gear rail support member which serves to rotate the tool post, and a cutting tool mounted thereon, about a predetermined vertical axis extending through the center points of the planar surfaces of the disc-shaped tool base.

PATENTED DEC 7 1971
3,626,456
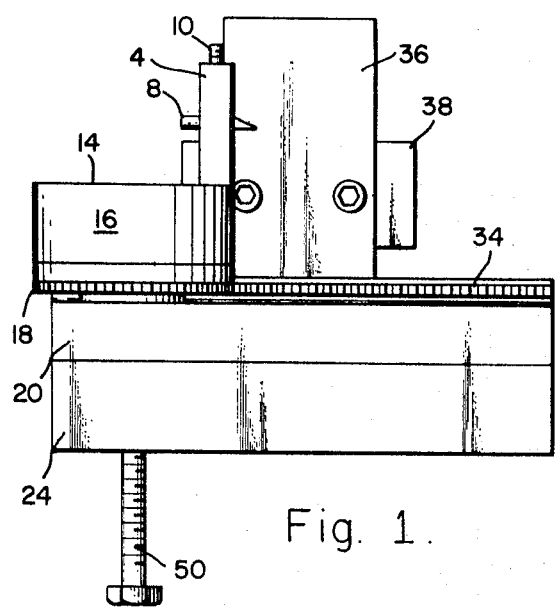
Fig. 1.
Fig. 2.
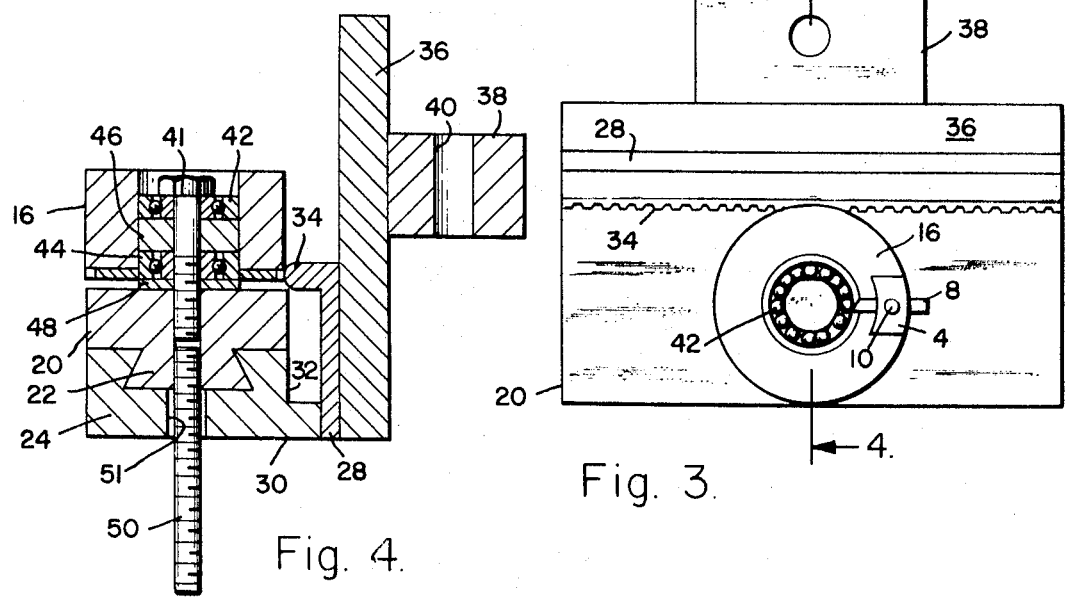
Fig. 4.
Fig. 3.
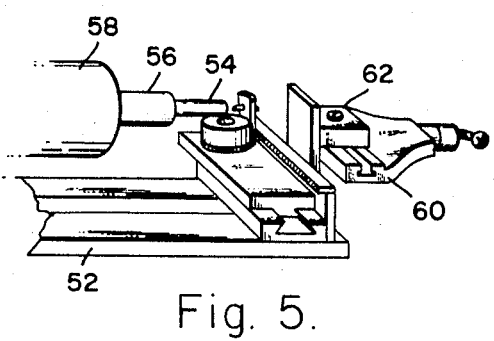
Fig. 5.
George W. Freeborn,
INVENTOR.
BY.
ATTORNEY.

RADIUS TURNING ATTACHMENT FOR LATHES

BACKGROUND OF THE INVENTION

This invention relates to a radius turning attachment, or a tool for cutting radii on rotating workpieces, which may be either automatically or manually operated on a conventional lathe.

There are a plurality of tools that are well known in the prior art which serve to cut radii on rotating workpieces. Conventionally, these tools are employed in conjunction with an ordinary lath and are used to fashion, for example, spherically shaped objects as well as various radial concavities. Exemplary of these prior art devices are the radius turning attachments disclosed by U.S. Pat. Nos. 2,716,913 and 3,345,893.

A disadvantage experienced in connection with such tools available in the prior art is that they are generally manually operated and therefore require the exertion of manually applied force and the close attention of the operator. Further, inaccuracies may often result from the manual incremental advancement of the cutting tool through the plurality of positions generally necessary to provide a workpiece with a desired shape. Thus, it is the intent of the present invention to eliminate these common difficulties experienced with well-known conventional tools for cutting radii on rotating workpieces.

SUMMARY OF THE INVENTION

Briefly described, the present invention involves a lathe-powered radius cutter that enables an operator to turn a plurality of radial configurations with a high degree of precision.

More particularly, a tool post is mounted or integrally formed on a top planar surface of a disc-shaped tool base having a ring gear peripherally situated about the bottom edge thereof. The tool base, along with an upper base plate, is fastened to a lathe compound with an anchor arm. A lower base plate is attached to a support member having a gear rail that is in operative interlocking relationship with the ring gear. A bracket, which is also attached to the support member, is adapted to be fastened to a conventional lathe carriage. Lateral movement of the lathe carriage serves to move the gear rail and thereby impart a circular or rotating movement to the tool post mounted on the disc-shaped tool base, and a tool fastened to the tool post, about a predetermined vertical axis extending through the center points of the planar surfaces of the disc-shaped tool base.

It is therefore an object of the present invention to provide an automatic or manually operated radius turning lathe attachment.

A further object of the present invention is to provide a radius turning attachment that is adapted to utilize the variable speed and feed capabilities of conventional lathes.

Another object of the present invention is to provide a radius turning attachment for lathes that is capable of turning radial concavities or spheres with a high degree of accuracy and precision.

DESCRIPTION OF THE DRAWINGS

Other objects and many attendant advantages of this invention will be more readily appreciated as the same becomes better understood by reference to the following detailed description which is to be considered in connection with the accompanying drawings in which like reference symbols designate like parts throughout the figures thereof and wherein:

FIG. 1 is a schematic diagram illustrating a frontal side view of a radius turning attachment, in accordance with the present invention, wherein the tool base is situated near one end of the base plates;

FIG. 2 is a schematic diagram illustrating an end view of a radius turning attachment in accordance with the present invention;

FIG. 3 is a schematic diagram illustrating a top view of a radius turning attachment, in accordance with the present invention, wherein the tool base is situated near the middle of the base plates;

FIG. 4 is a schematic diagram illustrating a cross-sectional end view of a radius turning attachment as shown in, and taken along the line 2—2 of, FIG. 3.

FIG. 5 is a schematic diagram illustrating an isometric view of a radius turning attachment situated to operate on a workpiece.

DESCRIPTION OF THE PREFERRED EMBODIMENTS

Referring to FIGS. 1, 2 and 3, a tool post 4 is adapted to have a bit mounting aperture 6 for the purpose of receiving a cutting tool bit 8. The cutting tool bit 8 may be secured in the aperture 6 with a suitable screw 10 which extends from an upper end portion 12 of the tool post 4 down through the body of the tool post 4 to the aperture 6. The tool post 4 is mounted on, or integrally formed with, an upper planar surface 14 of a disc-shaped tool base 16 which is adapted to have a ring gear 18 peripherally situated about the lower edge of its curved outer surface.

The disc-shaped tool base 16 is rotatably mounted on an upper base plate 20 having a male dovetail member 22 extending downwardly for the length of the upper baseplate 20. A lower baseplate 24 having a slot or female dovetail portion 26 extending along the length of the upper surface of the lower baseplate 24 is in longitudinal sliding engagement with the upper baseplate 20.

The lower base plate 24 is fastened to a gear rail support member 28 by a flange portion 30 orthogonally protruding from a lower side surface 32 of the lower baseplate 24 and extending along the length thereof.

A gear rail 34 is secured to the support member 28 and is positioned to be in engaging registration with the ring gear 18. It is to be noted that although the gear rail 34 is illustrated as having a somewhat rounded transverse configuration, it may be fashioned to have any other configuration, such as a squared or pointed configuration. It is understood that the transverse configuration of the ring gear 18 must be appropriately adapted to accommodate the design of the gear rail 34. It is to be further noted that the individual teeth forming the ring gear 18 and the gear rail 34 may respectively have any suitable spacing or frequency. Further, the respective frequencies of the teeth forming the ring gear 18 and gear rail 34 may be of any desired ratio relative to each other.

The gear rail support member 28 is fixedly secured to a bracket 36. It is understood that the illustrated height of the bracket 36 is merely exemplary and that the bracket 36 may be adapted to have any desirable height that is suitable to accommodate a particular lathe to be employed. The bracket 36 includes an orthogonally extending bracket arm 38 having a transverse aperture 40 that is intended to accommodate a clamping bolt or screw, the purpose of which is to be later explained.

Referring now to FIG. 4, the disc-shaped tool base 16 is rotatably mounted on the upper baseplate 20 by way of a bolt 41 and a pair annular roller bearing members 42 and 44 that may be respectively separated from each other by an appropriate disc member 46 which may be either a separate element or an integrally formed portion of the tool base 16.

An annular washer 48 may be used to maintain the roller bearing 44 in spaced relationship with the upper baseplate 20. An alternative would be to have the upper baseplate fabricated with a raised portion that would serve the function of the annular washer 48.

An anchor bolt 50 protrudes through a longitudinally extending slot 51 in the lower baseplate 24 and is accommodated by an appropriately threaded hole in the dovetail portion 22 of the upper baseplate 20. The anchor bolt 50 serves to secure the disc-shaped tool base 16 and the upper base plate 20 to a compound 52 of a lathe in a fashion illustrated in FIG. 5. Once secured to the compound 52, the upper base plate 20 and the tool base 16 are unable to be moved laterally. As such, a vertical axis extending through the center of the opposing planar surfaces of the tool base 16 would be fixed with regard to a rotating workpiece 54 that may be extended from a chuck 56 which is suitably mounted on a conventional headstock 58.

Operationally, once the tool base 16 and the upper base plate 20 are secured to the compound 52 of a conventional lathe, the bracket arm is secured to a carriage 60 of the lathe by way of an anchor bolt 62 extending through the aperture 40 in the bracket arm 38. Lateral movement of the carriage 60, using a conventional lathe power mechanism, will cause the bracket arm 38, the bracket 36, the support 28, the gear rail 34 and the lower base plate 24 to move with the carriage 60 as an integral unit. In that the gear rail 34 is in engaging registration with the ring gear 18, movement of the gear rail 34 will cause the disc-shaped tool base to rotate about the bolt 40. As such, the tool post 4 will also be rotated about the bolt 40 causing the tool 8 to be radially reoriented. The use of the gear rail 34 in combination with the ring gear 18 permits the tool 8 to be rotatably advanced for any desired amount or in a desired direction with a great amount of precision. Further, in that the gear rail 34 is caused to move by the powered carriage of the lathe, no manually exerted force is required to operate the inventive radius turning attachment. It should be noted, however, that the carriage of a conventional power lathe may customarily also be operated manually. As such, the present invention is also capable of being manually operated by simply disengaging the lathe power feed mechanism and using the ordinarily provided dial handle of the lathe.

The radius turning attachment of the present invention may be employed to turn any of the usual shapes involving radial cuts. For example, if the cutting tool bit 8 is situated to face away from the center of the tool base 16, concave cuts may be made. On the other hand, if the bit 8 is mounted with the cutting edge directed towards the center of the tool base 8, then convex radial cuts may be made.

It is to be noted that the tool base 16 may be mounted at any of the various positions along the length of the upper base plate 20 of the purpose of accommodating workpieces 54 of varying sizes or thicknesses.

The various parts of the present invention may be fabricated with any durable material such as a metal.

While preferred embodiments of the present invention have been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. A radius turning attachment of the type employed for providing a rotating workpiece with a predetermined external shape produced by radial cuts, said attachment comprising:

a disc-shaped tool base having an upper planar surface, a lower planar surface, and a curved side surface, said side surface being adapted to have a ring gear situated about the periphery thereof;

a tool post member mounted on said upper planar surface and adapted to receive a cutting bit;

an elongated gear rail positioned to be in engaging registration with said ring gear;

traversing means for moving said gear rail in a direction parallel to the longitudinal axis thereof whereby movement of said gear rail causes said disc-shaped tool base to be rotated about a vertical axis extending through the respective centers of said upper planar surface and said lower planar surface, said means including a support member having a platelike configuration affixed to said gear rail and to said second baseplate and also including a bracket with an upright portion and an arm portion orthogonally extending from said upright portion, said arm portion having a transverse aperture adapted to receive means for fastening said bracket to a movable carriage member of the lathe; and first and second baseplate members positioned in sliding abutting relationship, said tool base being rotatably mounted on said first baseplate member, and said second baseplate member being affixed to said traversing means wherein said gear rail and said second baseplate member are moved as unitary elements.

2. The apparatus defined by claim 1 wherein said second base plate is adapted to have a centrally oriented elongate transverse aperture aligned with the longitudinal axis of said second baseplate.

3. The apparatus defined by claim 2 further including an anchor bolt projecting through said centrally oriented transverse aperture and adapted to be fastened to said first baseplate wherein said anchor bolt serves to attach said first baseplate and said disc-shaped tool base to a compound of a lathe so as to maintain said first baseplate and said tool base in a laterally immovable position.

4. The apparatus defined by claim 3 wherein said tool post member includes a hole extending through one end thereof in a direction aligned with a radius of said upper planar surface.

5. The apparatus defined by claim 4 wherein said traversing means includes:

a support member, having a platelike configuration, affixed to said gear rail and to said second baseplate; and a bracket including an upright portion and an arm portion orthogonally extending from said upright portion, said arm portion having a transverse aperture adapted to receive means for fastening said bracket to a movable carriage member of a lathe.

6. The apparatus defined by claim 5 wherein said first base plate and said second base plate are maintained in slideable abutting relationship by being respectively adapted to have a longitudinal flange portion and a longitudinal slot for receiving said flange portion, each having a dovetail transverse configuration.

* * * * *